April 29, 1969 J. S. JOHNSTON 3,441,845
RESISTANCE COMPARISON MEANS HAVING A PAIR OF RECTIFYING CIRCUITS CONNECTED ACROSS A LOW FREQUENCY SIGNAL SOURCE
Filed Sept. 27, 1965
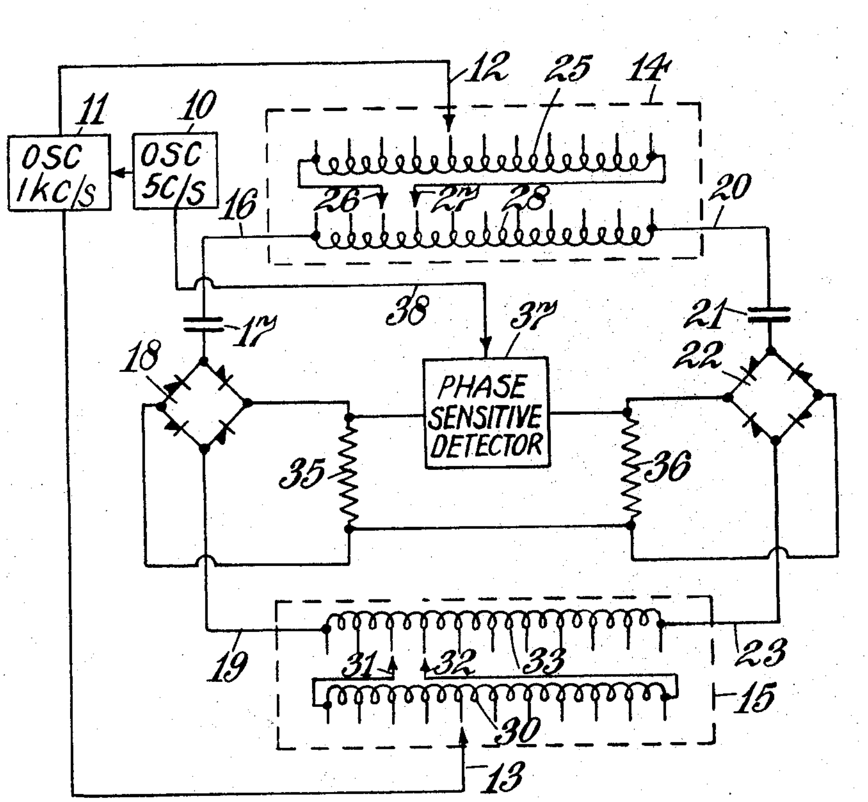

United States Patent Office 3,441,845

Patented Apr. 29, 1969

3,441,845

RESISTANCE COMPARISON MEANS HAVING A PAIR OF RECTIFYING CIRCUITS CONNECTED ACROSS A LOW FREQUENCY SIGNAL SOURCE

James Stewart Johnston, Bognor Regis, England, assignor to Rosemount Engineering Company Limited Filed Sept. 27, 1965, Ser. No. 490,403
Claims priority, application Great Britain, Oct. 15, 1964, 42,157/64
Int. Cl. G01r *27/02, 17/10*
U.S. Cl. 324—62 10 Claims

ABSTRACT OF THE DISCLOSURE

Resistance comparison means for measuring the ratio of two electrical resistances by comparing the voltages across the resistances when currents in known ratio are fed through them is characterized in that adjustable inductive current dividing means are provided for dividing the current from an alternating current source between two paths, one path including one of said resistances and a first rectifying circuit and the other path including the other resistance and a second rectifying circuit.

This invention relates to resistance comparators for comparing two electrical resistances and is a development of the invention described in co-pending application filed Sept. 18, 1964 for Resistance Comparison Means Having a Modulated Source and a Detector Sensitive to the Modulating Signal, now U.S. Patent No. 3,334,296, granted Aug. 1, 1967.

According to this invention, means for comparing two electrical resistances comprises current dividing means for dividing the inductive current from an alternating current source in known ratio between two paths, one path including one of said resistances and a first rectifying circuit and the other path including the other resistance and a second rectifying circuit, and detecting means for comparing the potentials across the two resistances. The current dividing means may comprise two adjustable inductive current dividers; each of these inductive dividers may, in the known manner, have more than one stage to provide a coarse adjustment and one or more stages of finer adjustment; conveniently decade stages are employed. The aforesaid inductive current divider or the first stage thereof may comprise a winding having a tapping point, which points on the two dividers are connected across said alternating current source. In a single stage divider, a first end of one of the two windings being connected through said one resistance and said first rectifying circuit to the first end of the other winding and the second output end of said one of the windings being connected through said other resistance and the second rectifying circuit to the second end of the other winding. The windings are preferably provided with a number of tapping points and selector means provided for selecting the tapping points to adjust thereby the current division. In this case the ratio of the two currents divided between the first and second outputs can be varied by varying the position of one or both of the tapping points.

With these arrangements, the potentials acoss the resistances are unidirectional and the detector may be a simple direct current detector. Preferably however, a modulator is provided for modulating the alternating current from said source at a low frequency, so that the potentials across the resistances have a component at this low frequency and the detector may then be tuned to this low frequency. The advantage of the low frequency modulation is that the reactive components of the resistance and resistance lead impedances can be neglected for siganls at this low frequency, and yet the transformers which carry the higher frequency alternating supply are of a relatively simple design.

The following is a description of one embodiment of the invention reference being made to the accompanying drawing which is a circuit diagram of an apparatus for comparing the magnitudes of two electrical resistances.

Referring to the drawing a 5 c./s. modulation signal generator 10 modulates the output of a 1 kc./s. oscillator 11. The output from the oscillator 11 is applied to the inputs 12 and 13 of the two adjustable current dividers 14, 15 dividing the modulated output to the oscillator 11 between two paths. One terminal 16 of the current divider 14 is connected via a capacitor 17 and a diode rectifier bridge 18 to one terminal 19 of the current divider 15. Similarly the other terminal 20 of the current divider 14 is connected via a capacitor 21 and a diode rectifier bridge 22 to the second terminal 23 of the current divider 15. For simplicity in the drawing, these current dividers are illustrated as two stage dividers. Considering the current divider 14, the input 12 is an adjustable tap on a winding 25, the ends of which are connected to two adjacent taps 26, 27 adjustable together along the length of a further winding 28. The ends of the winding 28 constitutes the aforementioned output terminals 16 and 20. Similarly the current divider 15 is illustrated as a two stage divider 15 with the input 13 applied to an adjustable tap on a first winding 30 ends of which are connected to two adjacent taps 31, 32 adjustable together along a second winding 33. The ends of this second winding 33 constitute the output terminals 19 and 23. The tapping points on the winding are evenly spaced and the two current dividers conveniently are arranged to form a two stage decade divider. The tapes 12, 13 on the windings 25 and 30 may be ganged together and likewise the pairs of taps 26, 27 and 31, 32 may be ganged together. Although not shown in the drawing, more than two stages may be employed for each current divider and a slide wire may be used for the final stage. Conveniently a modified Kelvin-Varley slide arrangement is employed.

The rectified outputs from the two bridges 18 and 22 are applied respectively across the two ressitors 35, 36 which are to be compared in magnitude. A detector 37 tuned to the 5 c./s. modulation frequency compares the potentials across the two resistors 35, 36. The currents through the two resistances 35, 36 are derived by rectifying the two currents provided by the dividers 14, 15. Hence the ratio of the two currents depends on the settings of the current dividers and this ratio can be controlled by the setting of the adjustable taps. Conveniently the detector 37 is a null detector so that, when it gives a null reading, the ratio of the two resistances 35, 36 can be calculated from the settings of the two current dividers 14, 15.

By using the low frequency modulation on a higher frequency signal, it is thus possible to use current dividers constructed to operate at the higher frequency thereby facilitating the use of inductive current dividers which can be of relative simple construction yet giving a high degree of accuracy. The reactive components of the resistances 35, 36 and the resistance lead impedances can be neglected, however, since they will be negligible for signals at the very low modulation frequency. Thus the bridge effectively compares only the resistive components. The provision of the capacitors 17 and 21 prevents the cores of the inductive dividers being polarised by direct currents from the bridges.

The arrangement described above in which the oscillator output is fed through current dividers to the rectifier bridges has a further very substantial advantage. When the potential drops in the two rectifiers bridges 18, 22 are equal, that is to say when the dividers have been adjusted to give a null balance, there is only a small potential between the two ends 16, 20 of the divider 14 and between the two ends 19, 23 of the divider 15. The flux densities in the cores of the windings are thus small so that the losses in these windings are small. The arrangement thus avoids any loss in accuracy at high magnitudes of resistances 35, 36.

It may be convenient in some cases to use a phase sensitive detector as the detector 37, employing a reference signal from the modulation signal generator 10 as shown at 38 in order to detect the direction of unbalance as well as the magnitude of unbalance. The reverse leakage current in the diodes of the rectifying bridges can be greatly reduced by operating the diodes at a reduced temperature. Conveniently therefore the diodes are cooled by means of a semi-conductor Peltier device. The diodes of these rectifier bridges desirably should have a very small stored charge as well as very small leakage current. Since normal methods of semi-conductor fabrication result in these two requirements being almost mutually exclusive, it is normally necessary to choose a diode lying between the two extremes. However, each of the arms of the bridges 18, 22 may comprise a pair of diodes in series, one diode of the pair having a characteristic with a very low reverse leakage current but not necessarily a low stored charge whilst the other diode of the pair has a very low stored charge but not necessarily a low reverse leakage current.

I claim:

1. Means for comparing two electrical resistances comprising an alternating current source, means for modulating the output of said source at a low frequency, first and second rectifying bridge circuits, each having two input terminals and two output terminals, adjustable inductive current dividing means having one input terminal connected to one side of said source and two output terminals, means connecting one of said two input terminals of said first rectifying bridge circuit to one of the output terminals of said adjustable inductive current dividing means, means connecting one of said two input terminals of said second rectifier bridge circuit to the other of said output terminals of said adjustable inductive current dividing means, means connecting the other input terminal of each of said rectifying bridge circuits to the other side of said source, means connecting one of said two electrical resistances between the two output terminals of said first rectifying bridge circuit, means connecting the other of said two electrical resistances between the two output terminals of the second rectifying bridge circuit, whereby the modulated alternating current from said source is divided in known adjustable ratio between two paths, one path including said one resistance and said first rectifying bridge circuit and the other path including the other of said resistances and said second rectifying bridge circuit, and detecting means tuned to said low frequency for comparing the amplitudes of the potentials at said low frequency across said resistances.

2. Means for comparing two electrical signals as claimed in claim 1, wherein said detector is a phase sensitive detector fed with a phase reference signal of said low frequency.

3. Means for comparing two electrical resistances as claimed in claim 1, wherein each of said rectifying circuits comprises a full-wave rectifier bridge with the input alternating current fed across one diagonal and the associated resistance connected across the other diagonal.

4. Means for comparing two electrical resistance as claimed in claim 3, wherein each rectifying bridge has a capacitor connected in series in its alternating current input circuit.

5. Means for comparing two electrical resistances as claimed in claim 1 wherein said detecting means is a null balance detector.

6. Means for comparing two electrical resistances comprising an alternating current source, first and second rectifying circuits, two adjustable inductive current dividers, each having one input terminal and two output terminals, means connecting said input terminals across said source, means connecting said first rectifying circuit in series between one output terminal of said current divider and one output terminal of the other current divider, means connecting said second rectifying circuit in series between the second output terminal of said one current divider and the second output terminal of said other current divider, means connecting one of said resistances across said first rectifying circuit and the other of said resistances across said second rectifying circuit, and detecting means for comparing the potentials across the two resistances.

7. Means for comparing two electrical resistances as claimed in claim 6 and further comprising means for modulating the output of said source at a low frequency and wherein said detecting means comprises a phase sensitive detector fed with a reference signal of said low frequency.

8. Means for comparing two electrical resistances as claimed in claim 7 wherein there are provided first and second capacitors connected respectively in series with said first and second rectifying circuits.

9. Means for comparing two electrical resistances as claimed in claim 6, wherein each inductive dividers has more than one stage to provide a coarse adjustment and at least one stage of finer adjustment.

10. Means for comparing two electrical resistances as claimed in claim 6 wherein each inductive current divider comprises a winding having a tapping point, the alternating current source being connected across the tapping points on the two dividers.

References Cited

UNITED STATES PATENTS

| | | | |
|---|---|---|---|
| 1,397,228 | 11/1921 | Nyquist | 324—63 |
| 3,334,296 | 8/1967 | Rogal et al. | 324—62 |

FOREIGN PATENTS

| | | |
|---|---|---|
| 917,196 | 1/1963 | Great Britain. |

OTHER REFERENCES

Clarke: "Transformer Bridges," Journal of Scientific Instruments, vol. 37, October 1960, pp. 381–384.

RUDOLPH V. ROLINEC, *Primary Examiner.*

E. E. KUBASIEWICZ, *Assistant Examiner.*